United States Patent [19]

Sgariglia

[11] 3,996,782

[45] Dec. 14, 1976

[54] CHAIN CUTTING APPARATUS

[76] Inventor: Vincent F. Sgariglia, 1044 Ashland Ave., Chicago Heights, Ill. 60411

[22] Filed: July 17, 1975

[21] Appl. No.: 596,830

[52] U.S. Cl. .................................. 72/332; 30/250; 83/589; 83/605

[51] Int. Cl.² ....................................... B21D 28/00

[58] Field of Search ............ 72/332; 59/23; 30/250, 30/249, 258; 83/580, 605, 607, 589

[56] References Cited

UNITED STATES PATENTS

| 786,053 | 3/1905 | Ross | 83/589 X |
|---|---|---|---|
| 1,010,577 | 12/1911 | Bolli et al. | 83/589 X |
| 1,122,319 | 12/1914 | Sleutz | 83/589 X |
| 1,469,467 | 10/1923 | Wagenbach | 30/250 X |
| 2,465,392 | 3/1949 | Nickell | 83/605 X |
| 2,915,822 | 12/1959 | Naito | 30/250 |
| 2,993,275 | 7/1961 | Naito | 30/250 |

Primary Examiner—Frank T. Yost
Attorney, Agent, or Firm—Leydig, Voit, Osann, Mayer & Holt, Ltd.

[57] ABSTRACT

A compact chain cutting apparatus for shearing and opening a chain link in one operation. A hand operated hydraulic jack is employed to actuate a pair of shearing members which not only cooperate to cut the link but also bend the severed ends of the link out of alignment to facilitate the removal of the link from those adjacent to it.

8 Claims, 5 Drawing Figures

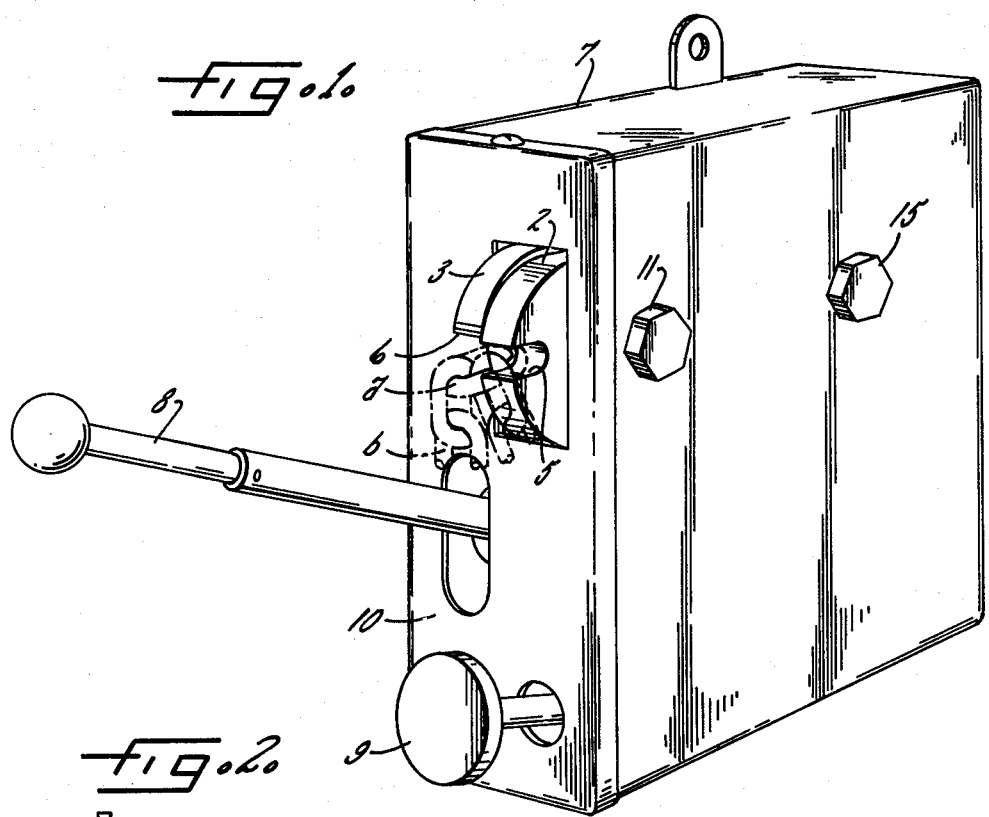
Fig. 1
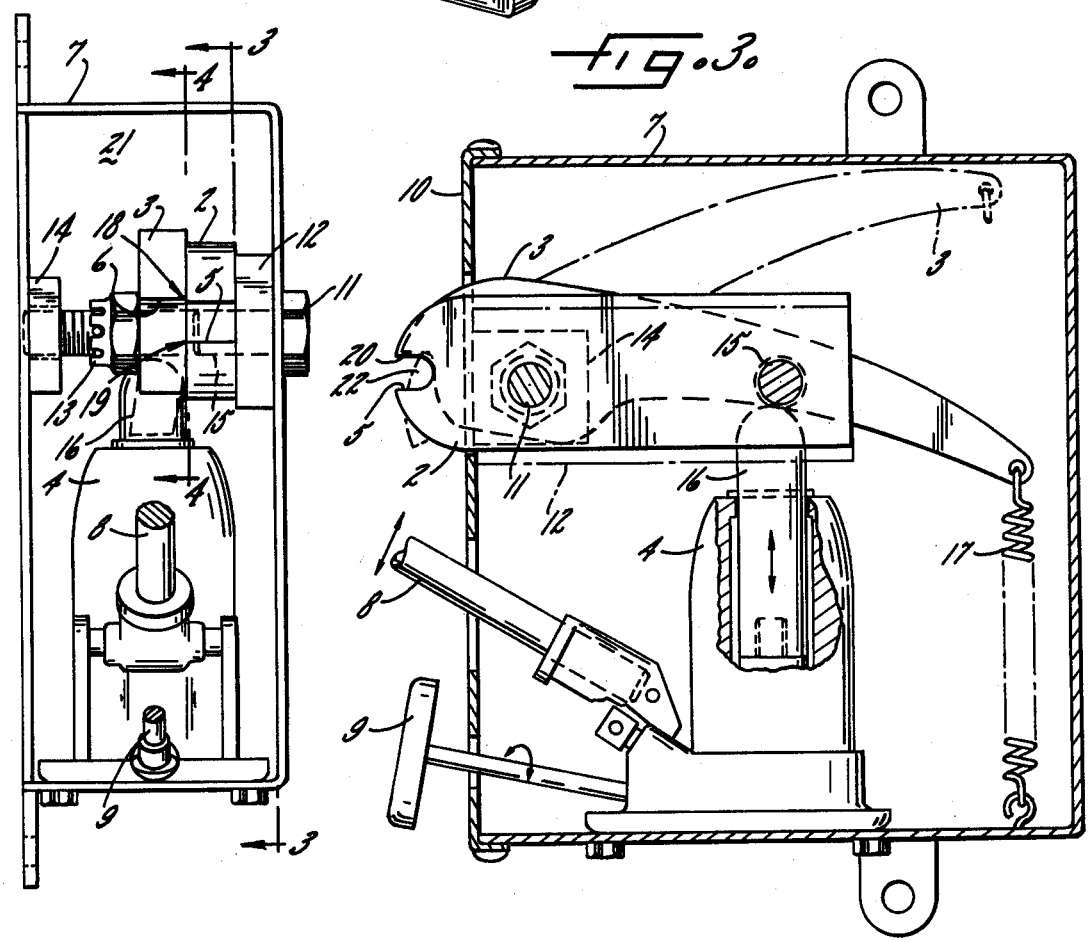
Fig. 2
Fig. 3

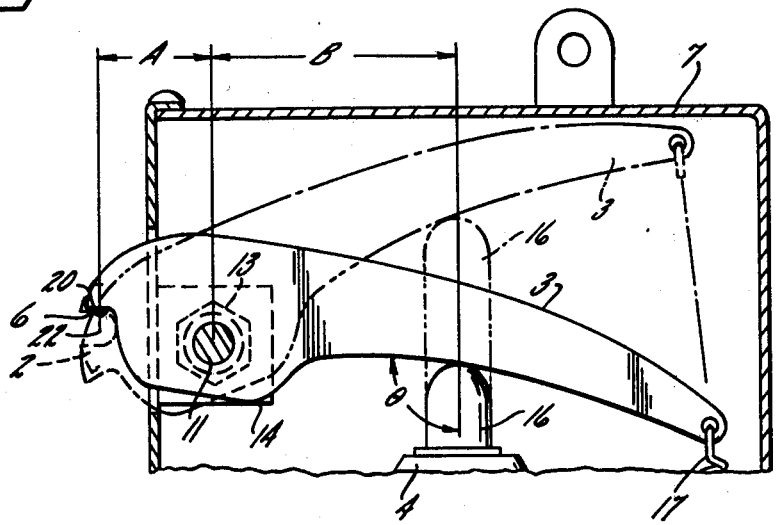
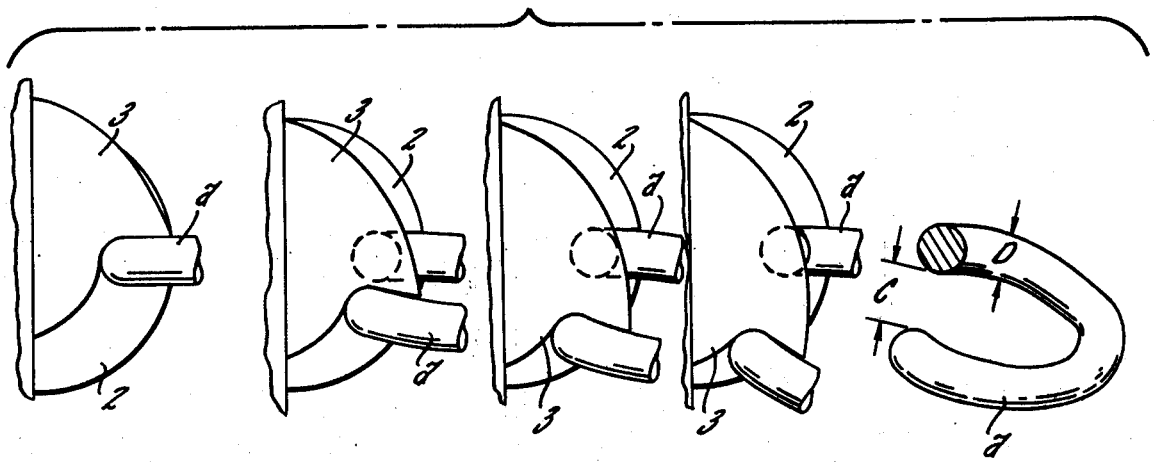

CHAIN CUTTING APPARATUS

This invention relates generally to a chain cutting apparatus and more particularly to a manually operated, hydraulically actuated apparatus for both cutting an opening chain links.

In retail establishments selling chain and in light manufacturing facilities, chain is generally cut by either sawing through the chain links or by using a cold forming pincher-type tool commonly called a "bolt cutter." While these techniques are adequate for cutting small gauge chains, the same techniques raise a number of practical problems in cutting larger gauge chains.

In the case of sawing through a link, the most serious problem arises from the necessity to support the chain link rigidly in a vice or other clamping apparatus while a hack saw is employed to saw through the link at a point along its circumference. If only one cut is made through the link, some means of bending the link must be employed in order to create an opening between the severed ends large enough to allow the cut link to be disengaged from the connecting links. This additional operation necessarily involves the use of a second tool, whether it be a lever-type instrument to pry open the link or an impact-type instrument to hammer the link open. The bending operation can be eliminated by sawing through the link at a second point thereby bisecting the link. This second cutting operation is time consuming and difficult when dealing with heavy gauge chains.

When a bolt cutter or similar tool is used, again it is necessary either to cut the link in two places or employ supplemental means to bend the cut link open. Another problem arises because of the difficulty in holding the tool; namely, the risk that the cutting edges will be abused.

Moreover, while cable or wire rope may be cut by sawing, sawing causes fraying at the cut ends. Cutting cable or wire rope by cold forming techniques is only effective if the working edges of the "bolt cutter" are maintained adequately to sever the individual strands of the cable. It is often difficult to so maintain the edges when, as a result of economy, the same tool is used on chain, bolts, cable and other like materials.

Accordingly, it is a primary aim of the present invention to provide a unitary apparatus with which in a single operation the chain links may be both cut and opened thereby minimizing the time, energy, and equipment required.

A further object is to provide a chain cutting apparatus which is compact, powerful enough to operate on chain links of heavy as well as light gauge, and composed of relatively inexpensive components, to fulfill the cutting needs of retail establishments and light manufacturing facilities.

An additional object is to provide an apparatus capable of cutting not only chain but also bolts, wire rope and the like.

Other objects and advantages of the invention will become apparent upon reading the following detailed description and upon reference to the drawings, in which:

FIG. 1 is a perspective view showing the chain cutting apparatus according to the present invention;

FIG. 2 is a front view of the chain cutting apparatus partially in section with the cover removed;

FIG. 3 is a sectional view taken along line 3—3 of FIG. 2 illustrating the operational parts of the cutter;

FIG. 4 is a partial sectional view taken along line 4-4 of FIG. 2 illustrating the extreme positions of the pivoting shearing blade; and FIG. 5 is a stop action view of the apparatus cutting and opening a link.

While the invention is susceptible of various modifications and alternative constructions, there is shown in the drawings and will herein be described in detail the preferred embodiment. It is to be understood, however, that it is not intended to limit the invention to the specific form disclosed. On the contrary, it is intended to cover all modifications and alternative constructions falling within the spirit and scope of the invention as expressed in the appended claims.

Shown in the drawings is an apparatus for cutting chains, bolts and cable of small cross section and particularly advantageous in cutting chain. The apparatus employs a pair of shearing members which interact to first shear a link of chain at a point along its circumference and then to bend the link. The latter operation of opening the link to permit the disengagement of the severed link is more efficient, energy wise, than generating a second cut to facilitate removal of the link. To reduce the operating force to a level which can be conveniently applied by a wide range of operators, a hand operated hydraulic jack multiplies the applied force and exerts it upon a lever arm which actuates the shears to perform the shearing and bending operations.

Turning now to the drawings, FIG. 1 is a perspective view of the cutting apparatus 1. A pair of shearing members 2 and 3 are utilized for the shearing and bending operations described above. One shearing member 2 is stationary while the other member 3 is in the form of a pivotable lever. A conventional manually operated hydraulic jack 4 is employed to pivot the levered shearing member 3 to generate the shearing and bending action between the primary bearing surfaces 5 and 6 of the shearing members 2 and 3, respectively. The unitary housing 7 supplies support for the hydraulic jack 4 and the shearing members 2 and 3. The housing 7 also serves to contain the mechanism in a compact, regularly shaped package easily adapted to be mounted free standing on legs, or attached directly to a point-of-purchase chain display unit. The shearing and bending portions of the shearing members 2 and 3, the telescoping pump handle 8 of the hydraulic jack 4 and the bypass control 9 of the jack, project through the front panel 10 of the chain cutting apparatus 1 for access by the operator.

FIGS. 2 and 3 show the internal mechanism of the chain cutting apparatus 1. A bolt 11 serves the dual purpose of securing one end of the stationary shearing member 2 and of providing the fulcrum about which the levered shearing member 3 pivots. This bolt 11 passes through the housing 7, a spacing and reinforcing pad 12 permanently affixed to said housing, the stationary shearing member 2, the levered shearing member 3, a lock nut 13 and then threads into a reinforcing pad 14 permanently affixed to the other side of the housing 7. A second bolt 15 passes through the housing 7 and pad 12 and threads directly into a stationary shearing member 2 to secure it in a horizontal position.

The hydraulic jack 4 is located such that upon the manual pumping of the jack handle 8, the hemispherical upper surface of the jack piston 16 acts upon the arcuate lower surface of the levered In a preferred embodiment of the invention, the angle between the primary bearing surface 6 of the levered shearing member 3 and the shearing plane 21 is slightly less than 90°, illustratively 89°, where they meet to form the shearing edge 18. This configuration serves to assure that, even after minor retouching of the shearing edge 18 should it become dull or chipped, the shearing edge will contact the material to be sheared prior to contact by the primary bearing surface 6. This sequence of contact facilitates clean shearing action.

To operate the apparatus, the internal bypass of the hydraulic jack 4 is opened momentarily by turning the handle 8 to release any residual fluid pressure acting upon the jack piston 16, thereby allowing the retraction spring 17 to position the levered shearing member 3 in its fully clockwise position as shown by the solid lines in FIG. 4. It should be noted that by designing the various components and positioning them in such a manner that the fully retracted jack piston 16 defines the clockwise limit of travel of the levered shearing member 3, the jack piston stroke can be minimized.

Next, the operator inserts a link of chain $a$ of a length of chain $b$ into the recess 22 in the stationary shearing member 2 formed by the primary and secondary bearing surfaces 5, 20. The chain link $a$ should be positioned such that a portion of the chain link extends through the shearing plane 21.

FIG. 5 illustrates by stop action the interaction of the shearing blades 2 and 3 and the resultant effect upon link $a$ as the handle 8 is manually pumped by the operator. The mechanical advantage achieved through the use of the hydraulic jack and the lever arm enable large gauge chain to be easily cut. For example, tests indicate that a standard ⅜ inch chain link can be sheared and opened with 40 foot pounds of energy. As made clear by FIG. 4, lever arm lengths A and B of member 3 and the stroke of the jack piston 16 are selected to cause the primary bearing surface 6 to move past the primary bearing surface 5 to continue bending the link after it has been severed. A severed and bent link is shown in the last of the sequence in FIG. 5. The apparatus is designed to create an opening between the severed ends sufficient to allow the sheared and bent link to be removed from the adjacent intact links. Thus, in the last sequence of FIG. 5, dimension C must slightly exceed D. As explained above, throughout the shearing and bending operations the secondary bearing surface 20 of the stationary shearing member 2 bears upon the link to prevent excessive twisting of the link $a$ which might otherwise result. The twisting, if unrestrained, would impair the capacity of the apparatus to generate a sufficient opening through which the adjacent intact links could be removed.

It will be appreciated that the shearing members must be of substantial width for at least two reasons. First, the high stresses to which the members are subjected require that the members have sufficient strength to perform the above described shearing and bending operations without permanent distortion which would impair the subsequent operation of the apparatus. Second, the bearing surfaces must be of sufficient area to assure that they positively engage the severed ends of the link being cut and bent apart.

On the other hand, shearing members of excessive width increase both the cost and weight of the apparatus. It is preferable, but not essential, that the members be of substantially equal width so that they act similarly on both severed ends of the link.

Satisfactory results have been achieved using ⅝ inch wide steel blades to shear and bend ⅜ inch chain.

From the above detailed description, it is clear that under normal operating conditions, the apparatus should require little maintenance. Any wear between the shearing members can be readily compensated for by adjusting the lock nut 13. Should the shearing edges 18, 19 become worn or chipped, the shearing members may be readily removed for sharpening or replacement. Such measures should be required infrequently, however, as the machine is protected against harm resulting from excessive strain through the safeguard or spacing primary and second bearing surfaces 5, 20 of the stationary shearing member 2 to accept only chains of manageable size.

It is also apparent from the description and drawings that bolts, cable and other items having small cross sections can be sheared with the apparatus. The overtravel of the primary bearing surface 6 of the levered shearing member 3 beyond the primary bearing surface 5 of the stationary shearing member 2, utilized to open a chain link after it has been severed, is superfluous for these operations.

I claim as my invention:
1. An apparatus for shearing and bending a chain link, said apparatus comprising:
   a first shearing member, said first shearing member having one surface defining a shearing plane and terminating in a first shearing edge, said first shearing member having a U-shaped recess, the surfaces of said recess lying substantially perpendicular to said shearing plane and spaced apart a distance slightly greater than the maximum thickness of the chain links to be cut, one of said recess surfaces being a primary bearing surface to exert shearing and bending forces upon a chain link, the other of said recess surfaces providing a secondary bearing surface for preventing unrestrained twisting during the shearing and bending operations;
   a second shearing member, said second shearing member having a surface defining a shearing plane and terminating in a second shearing edge, said second shearing member having another surface substantially perpendicular to said shearing plane, and providing a primary bearing surface to exert shearing and bending forces upon a chain link;
   means for connecting said first and second shearing members for relative shearing action between said primary bearing surfaces and shearing edges; and
   means for moving the primary bearing surface and second shearing edge of said second shearing member toward and beyond the primary bearing surface and first shearing edge of said first shearing member to shear a chain link along said shearing plane and to bend the severed ends apart while the link is restrained against excessive twisting by said secondary bearing surface, to generate an opening between the severed ends of said link greater than the thickness of said link.

2. An apparatus for shearing and bending a chain link, said apparatus comprising:
   a housing;
   a first shearing member affixed to said housing, said first shearing member having one surface defining a shearing plane and terminating in a first shearing edge, said first shearing member having a U-shaped recess, the surfaces of said recess lying substantially perpendicular to said shearing plane and spaced apart a distance slightly greater than the maximum thickness of the chain links to be cut, one of said recess surfaces being a primary bearing surface to exert shearing and bending forces upon a chain link, the other of said recess surfaces providing a secondary bearing surface for preventing unrestrained twisting during the shearing and bending operations;

a second shearing member, said second shearing member mounted to said housing for movement parallel to said shearing plane, said second shearing member having a surface lying substantially coplanar with said shearing plane and terminating in a second shearing edge, said second shearing member having another surface lying substantially perpendicular to said shearing plane and providing a primary bearing surface to exert shearing and bending forces upon a chain link, said primary bearing surface of said second shearing member facing the opposite direction from said primary bearing surface of said first shearing member;

a manually operated hydraulic jack mounted to said housing, the driving piston of said jack interconnected with said second shearing member for producing shearing action between said first and second shearing members, the stroke of said jack sufficient to move the primary bearing surface and said second shearing edge of said second shearing member toward and beyond the primary bearing surface and said first shearing edge of said first shearing member to shear a chain link along said shearing plane and to bend the severed ends apart while the link is restrained against excessive twisting by said secondary bearing surface, to generate an opening between the severed ends of said link greater than the thickness of said link.

3. An apparatus as set forth in claim 2 having means for biasing said first shearing edge away from said second shearing member when said hydraulic jack is deactivated.

4. An apparatus as set forth in claim 3, said biasing means being a spring connected between said second shearing member and said housing.

5. An apparatus as set forth in claim 2, the second shearing member being in the form of a lever, the fulcrum for said lever being a rod passing through said second shearing member and supported at each end by said housing, said second shearing member having a lever arm upon which the driving piston of said hydraulic jack operates for producing said shearing action between said first and second shearing members.

6. An apparatus as set forth in claim 5, further comprising a spring connected between said second shearing member and said housing for biasing said first shearing edge away from said second shearing edge when said hydraulic jack is deactivated.

7. An apparatus as set forth in claim 6, said lever arm of said second shearing member being concave toward said piston in the plane of movement for optimizing the pressure angle between said piston and said arm and reducing the overall size of said housing.

8. An apparatus for shearing and bending a chain link, said apparatus comprising:

a housing;

a first shearing member affixed to said housing, said first shearing member having a U-shaped recess, one of said recess surfaces being a primary bearing surface to exert shearing and bending forces upon a chain link, the other of said recess surfaces providing a secondary bearing surface for preventing urestrained twisting during the shearing and bending operations;

a second shearing member mounted to said housing for movement to exert shearing and bending forces upon a chain link, said second shearing member having a bearing surface facing the opposite direction from said primary bearing surface of said first shearing member; and a manually operated hydraulic jack mounted to said housing, the driving piston of said jack interconnected with said second shearing member for procuding shearing action between said first and second shearing members, the stroke of said jack sufficient to move said bearing surface of said second shearing member toward and beyond the primary bearing surface of said first shearing member to shear a chain link and to bend the severed ends apart while the link is restrained against excessive twisting by said secondary bearing surface, to generate an opening between the severed ends of said link greater than the thickness of said link.

* * * * *